United States Patent
Radi et al.

(10) Patent No.: US 12,452,189 B2
(45) Date of Patent: Oct. 21, 2025

(54) CONTEXT-AWARE NVMe PROCESSING IN VIRTUALIZED ENVIRONMENTS

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 786 days.

(21) Appl. No.: 17/829,712

(22) Filed: Jun. 1, 2022

(65) Prior Publication Data

US 2023/0396561 A1  Dec. 7, 2023

(51) Int. Cl.
*H04L 47/78* (2022.01)
*H04L 47/70* (2022.01)
(Continued)

(52) U.S. Cl.
CPC .......... *H04L 47/781* (2013.01); *H04L 47/762* (2013.01); *H04L 47/808* (2013.01);
(Continued)

(58) Field of Classification Search
CPC ... H04L 47/781; H04L 47/762; H04L 47/808; H04L 47/822; H04L 49/3045; H04L 49/356
See application file for complete search history.

(56) References Cited

U.S. PATENT DOCUMENTS 6,381,686 B1  4/2002  Imamura
8,412,907 B1  4/2013  Dunshea et al.
(Continued)

FOREIGN PATENT DOCUMENTS

CN  106603409 A  4/2017
CN  112351250 A  2/2021
(Continued)

OTHER PUBLICATIONS maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.

(Continued)

*Primary Examiner* — Ricky Q Ngo
*Assistant Examiner* — Kabir U Jahangir
(74) *Attorney, Agent, or Firm* — Barry IP Law, P.C.

(57) ABSTRACT

A node includes a shared memory for a distributed memory system on a network. A Non-Volatile Memory express (NVMe) request is received from a user space application executed by a Virtual Machine (VM) to send an NVMe command to a different node in the network. If a data size for the NVMe request exceeds a maximum segment size of an NVMe over Fabric (NVMe-oF) connection, packets are created to be sent for the NVMe request and an order is determined for sending the packets with one or more packets including data for the NVMe command being sent before a last packet that includes the NVMe command. In another aspect, Virtual Switching (VS) queues are created in a kernel space with each VS queue corresponding to a different respective user space application initiating requests and at least one user space application being executed by one or more other nodes.

20 Claims, 5 Drawing Sheets

(51) Int. Cl.
  *H04L 47/762* (2022.01)
  *H04L 47/80* (2022.01)
  *H04L 49/00* (2022.01)
  *H04L 49/356* (2022.01)

(52) U.S. Cl.
  CPC ........ *H04L 47/822* (2013.01); *H04L 49/3045* (2013.01); *H04L 49/356* (2013.01)

(56) References Cited

U.S. PATENT DOCUMENTS

| | | |
|---|---|---|
| 8,700,727 B1 | 4/2014 | Gole et al. |
| 10,027,697 B1 | 7/2018 | Babun et al. |
| 10,362,149 B2 | 7/2019 | Biederman et al. |
| 10,530,711 B2 | 1/2020 | Yu et al. |
| 10,628,560 B1 | 4/2020 | Siranni et al. |
| 10,706,147 B1 | 7/2020 | Pohlack |
| 10,754,707 B2 | 8/2020 | Tamir et al. |
| 10,757,021 B2 | 8/2020 | Man et al. |
| 11,134,025 B2 | 9/2021 | Billore et al. |
| 11,223,579 B2 | 1/2022 | Lu |
| 2002/0143843 A1 | 10/2002 | Mehta |
| 2005/0257263 A1 | 11/2005 | Keohane et al. |
| 2006/0101466 A1 | 5/2006 | Kawachiya et al. |
| 2007/0067840 A1 | 3/2007 | Young |
| 2009/0249357 A1 | 10/2009 | Chanda et al. |
| 2010/0161976 A1 | 6/2010 | Bacher |
| 2011/0126269 A1 | 5/2011 | Youngworth |
| 2012/0198192 A1 | 8/2012 | Balasubramanian et al. |
| 2012/0207026 A1 | 8/2012 | Sato |
| 2014/0143365 A1 | 5/2014 | Guerin et al. |
| 2014/0283058 A1 | 9/2014 | Gupta |
| 2015/0006663 A1 | 1/2015 | Huang |
| 2015/0319237 A1 | 11/2015 | Hussain et al. |
| 2015/0331622 A1 | 11/2015 | Chiu et al. |
| 2017/0163479 A1 | 6/2017 | Wang et al. |
| 2017/0269991 A1 | 9/2017 | Bazarsky et al. |
| 2018/0004456 A1 | 1/2018 | Talwar et al. |
| 2018/0012020 A1 | 1/2018 | Prvulovic et al. |
| 2018/0032423 A1 | 2/2018 | Bull et al. |
| 2018/0060136 A1 | 3/2018 | Herdrich et al. |
| 2018/0173555 A1 | 6/2018 | Lutas |
| 2018/0191632 A1 | 7/2018 | Biederman et al. |
| 2018/0341419 A1 | 11/2018 | Wang et al. |
| 2018/0357176 A1 | 12/2018 | Wang |
| 2019/0227936 A1 | 7/2019 | Jang |
| 2019/0280964 A1 | 9/2019 | Michael et al. |
| 2019/0280991 A1* | 9/2019 | Singh ............... H04L 49/90 |
| 2020/0034538 A1 | 1/2020 | Woodward et al. |
| 2020/0201775 A1 | 6/2020 | Zhang et al. |
| 2020/0252452 A1* | 8/2020 | Richards ............. G06F 16/1774 |
| 2020/0274952 A1 | 8/2020 | Waskiewicz et al. |
| 2020/0285591 A1 | 9/2020 | Luo et al. |
| 2020/0322287 A1 | 10/2020 | Connor et al. |
| 2020/0403905 A1 | 12/2020 | Allen et al. |
| 2020/0409821 A1 | 12/2020 | Terada et al. |
| 2021/0019197 A1 | 1/2021 | Tamir et al. |
| 2021/0058424 A1 | 2/2021 | Chang et al. |
| 2021/0103505 A1 | 4/2021 | Tsuchiya |
| 2021/0149763 A1 | 5/2021 | Ranganathan et al. |
| 2021/0157740 A1 | 5/2021 | Benhanokh et al. |
| 2021/0240621 A1 | 8/2021 | Fu et al. |
| 2021/0266253 A1* | 8/2021 | He ............... H04L 49/70 |
| 2021/0320881 A1 | 10/2021 | Coyle et al. |
| 2021/0377150 A1 | 12/2021 | Dugast et al. |
| 2022/0035698 A1 | 2/2022 | Vankamamidi et al. |
| 2022/0058062 A1* | 2/2022 | Sztejna ............... G06F 9/545 |
| 2022/0121362 A1 | 4/2022 | Liu et al. |
| 2022/0294883 A1 | 9/2022 | Pope et al. |
| 2022/0350516 A1 | 11/2022 | Bono et al. |
| 2022/0357886 A1 | 11/2022 | Pitchumani et al. |
| 2022/0414968 A1 | 12/2022 | Wiegert et al. |
| 2023/0066013 A1* | 3/2023 | Ball ............... G06F 21/606 |

FOREIGN PATENT DOCUMENTS

| | | |
|---|---|---|
| EP | 3358456 A1 | 8/2018 |
| EP | 3598309 B1 | 5/2022 |
| KR | 1020190090331 A | 8/2019 |
| WO | 2018086569 A1 | 5/2018 |
| WO | 2018145725 A1 | 8/2018 |
| WO | 2021226948 A1 | 11/2021 |

OTHER PUBLICATIONS

International Search Report and Written Opinion dated Oct. 25, 2022 from International Application No. PCT/US2022/030414, 11 pages.

Sabella et al.; "Using eBPF for network traffic analysis"; available at: Year: 2018; https://www.ntop.org/wp-content/uploads/2018/10/Sabella.pdf.

International Search Report and Written Opinion dated Nov. 18, 2022 from International Application No. PCT/US2022/030437, 10 pages.

Pending U.S. Appl. No. 17/850,767, filed Jun. 27, 2022, entitled "Memory Coherence in Virtualized Environments", Marjan Radi.

Pending U.S. Appl. No. 17/836,927, filed Jun. 9, 2022, entitled "Resource Allocation in Virtualized Environments", Marjan Radi.

Gao et al.; "OVS-CAB: Efficient rule-caching for Open vSwitch hardware offloading"; Computer Networks; Apr. 2021; available at: https://www.sciencedirect.com/science/article/abs/pii/S1389128621000244.

Pfaff et al.; "The Design and Implementation of Open vSwitch"; Usenix; May 4, 2015; available at: https://www.usenix.org/conference/nsdi15/technical-sessions/presentation/pfaff.

Bijlani et al.; "Extension Framework for File Systems in User space"; Jul. 2019; Usenix; available at: https://www.usenix.org/conference/atc19/presentation/bijlani.

Brad Fitzpatrick; "Distributed Caching with Memcached"; Aug. 1, 2004; Linux Journal; available at: https://www.linuxjournal.com/article/7451.

Roderick W. Smith; "The Definitive Guide to Samba 3"; 2004; APress Media; pp. 332-336; available at: https://link.springer.com/book/10.1007/978-1-4302-0683-5.

Wu et al.; "NCA: Accelerating Network Caching with express Data Path"; Nov. 2021; IEEE; available at https://ieeexplore.ieee.org/abstract/document/9680837.

Kang et al.; "Enabling Cost-effective Data Processing with Smart SSD"; 2013 IEEE 29th Symposium on Mass Storage Systems and Technologies (MSST); available at: https://pages.cs.wisc.edu/~yxy/cs839-s20/papers/SmartSSD2.pdf.

Ghigoff et al, "BMC: Accelerating Memcached using Safe In-kernel Caching and Pre-stack Processing"; In: 18th USENIX Symposium on Networked Systems Design and Implementation (NSDI 2021); p. 487-501; Apr. 14, 2021.

International Search Report and Written Opinion dated Sep. 30, 2022 from International Application No. PCT/US2022/029527, 9 pages.

Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.

Pinto et al; "Hoard: A Distributed Data Caching System to Accelerate Deep Learning Training on the Cloud"; arXiv; Dec. 3, 2018; available at: https://arxiv.org/pdf/1812.00669.pdf.

International Search Report and Written Opinion dated Oct. 7, 2022 from International Application No. PCT/US2022/030044, 10 pages.

Patterson et al.; "Computer Architecture: A Quantitative Approach"; 1996; Morgan Kaufmann; 2nd ed.; pp. 378-380.

Bachl et al.; "A flow-based IDS using Machine Learning in EBPF"; Cornell University; Feb. 19, 2021; available at https://arxiv.org/abs/2102.09980.

Caviglione et al.; "Kernel-level tracing for detecting stegomalware and covert channels in Linux environments"; Computer Networks 191; Mar. 2021; available at: https://www.researchgate.net/publication/

(56) References Cited

OTHER PUBLICATIONS

350182568_Kernel-level_tracing_for_detecting_stegomalware_and_covert_channels_in_Linux_environments.
Dimolianis et al.; "Signature-Based Traffic Classification and Mitigation for DDoS Attacks Using Programmable Network Data Planes"; IEEE Access; Jul. 7, 2021; available at: https://ieeexplore.ieee.org/stamp/stamp.jsp?arnumber-9511420.
Jun Li; "Efficient Erasure Coding In Distributed Storage Systems"; A thesis submitted in conformity with the requirements for the degree of Doctor of Philosophy Graduate Department of Electrical and Computer Engineering, University of Toronto; Nov. 2017; available at: https://tspace.library.utoronto.ca/bitstream/1807/80700/1/Li_Jun_201711_PhD_thesis.pdf.
Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.
Navarre et al.; "SRv6-FEC: Bringing Forward Erasure Correction to IPv6 Segment Routing"; SIGCOMM '21: Proceedings of the SIGCOMM '21 Poster and Demo Sessions; Aug. 2021; pp. 45-47; available at: https://dl.acm.org/doi/10.1145/3472716.3472863.
Van Schaik et al.; "RIDL: Rogue In-Flight Data Load"; Proceedings—IEEE Symposium on Security and Privacy; May 2019; available at: https://mdsattacks.com/files/ridl.pdf.
Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.
Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.
Baidya et al.; "eBPF-based Content and Computation-aware Communication for Real-time Edge Computing"; IEEE International Conference on Computer Communications (Infocom Workshops); May 8, 2018; available at https://arxiv.org/abs/1805.02797.
Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/doi/10.1145/3429357.3430519.
Blin et al.; "Toward an in-kernel high performance key-value store implementation"; Oct. 2019; 38th Symposium on Reliable Distributed Systems (SRDS); available at: https://ieeexplore.ieee.org/document/9049596.
Enberg et al.; "Partition-Aware Packet Steering Using XDP and eBPF for Improving Application-Level Parallelism"; ENCP; Dec. 9, 2019; 7 pages; available at: https://penberg.org/papers/xdp-steering-encp19.pdf.
Kicinski et al.; "eBPF Hardware Offload to SmartNICs: cls_bpf and XDP"; Netronome Systems Cambridge, United Kingdom; 2016; 6 pages; available at https://www.netronome.com/media/documents/eBPF_HW_OFFLOAD_HNiMne8_2_.pdf.
Kourtis et al.; "Safe and Efficient Remote Application Code Execution on Disaggregated NVM Storage with eBPF"; Feb. 25, 2020; 8 pages; available at https://arxiv.org/abs/2002.11528.
Wu et al.; "BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.
Pending U.S. Appl. No. 17/561,898, filed Dec. 24, 2021, entitled "In-Kernel Caching for Distributed Cache", Marjan Radi.
Pending U.S. Appl. No. 17/571,922, filed Jan. 10, 2022, entitled "Computational Acceleration for Distributed Cache", Marjan Radi.
Pending U.S. Appl. No. 17/665,330, filed Feb. 4, 2022, entitled "Error Detection and Data Recovery for Distributed Cache", Marjan Radi.
Pending U.S. Appl. No. 17/683,737, filed Mar. 1, 2022, entitled "Detection of Malicious Operations for Distributed Cache", Marjan Radi.
Pending U.S. Appl. No. 17/741,244, filed May 10, 2022, entitled "In-Kernel Cache Request Queuing for Distributed Cache", Marjan Radi.
Tu et al.; "Bringing the Power of eBPF to Open vSwitch"; Linux Plumber 2018; available at: http://vger.kernel.org/ipc_net2018_talks/ovs-ebpf-afxdp.pdf.

\* cited by examiner

CONTEXT-AWARE NVMe PROCESSING IN VIRTUALIZED ENVIRONMENTS

CROSS-REFERENCE TO RELATED APPLICATIONS

This application is related to U.S. application Ser. No. 17/561,898 titled "IN-KERNEL CACHING FOR DISTRIBUTED CACHE", filed on Dec. 24, 2021, which is hereby incorporated by reference in its entirety. This application is also related to U.S. application Ser. No. 17/571,922 titled "COMPUTATIONAL ACCELERATION FOR DISTRIBUTED CACHE", filed on Jan. 10, 2022, which is hereby incorporated by reference in its entirety. This application is also related to U.S. application Ser. No. 17/665,330 titled "ERROR DETECTION AND RECOVERY FOR DISTRIBUTED CACHE", filed on Feb. 4, 2022, which is hereby incorporated by reference in its entirety. This application is also related to U.S. application Ser. No. 17/683,737 titled "DETECTION OF MALICIOUS OPERATIONS FOR DISTRIBUTED CACHE", filed on Mar. 1, 2022, which is hereby incorporated by reference in its entirety. This application is also related to U.S. application Ser. No. 17/741,244 titled "IN-KERNEL CACHE REQUEST QUEUING FOR DISTRIBUTED CACHE", filed on May 10, 2022, which is hereby incorporated by reference in its entirety.

BACKGROUND

Current trends in cloud computing, big data, and Input/Output (I/O) intensive applications have led to greater needs for high performance distributed shared memory systems in terms of low latency, high throughput, and bandwidth. In addition, the growth of real-time and interactive big data applications relies on fast and high-performance memory. Non-Volatile Memory express (NVMe) is an emerging host controller interface originally designed for Peripheral Component Interface express (PCIe)-based Solid State Drives (SSDs) to provide increased performance in terms of Input/Output Operations Per Second (IOPS). Due to the superior performance of NVMe technology in terms of latency and bandwidth, it is becoming the new industry standard for both client devices and data center servers.

In addition, virtual network switching and network function virtualization, such as software switching, can improve distributed memory configuration, flexibility, and scalability, while reducing system cost. Although virtual switching, such as with Open vSwitch (OVS), can reduce packet processing latency, such virtual switching does not provide a predictable NVMe access latency and memory bandwidth that considers the performance requirements of different applications. In this regard, there are still performance bottlenecks that prevent taking full advantage of NVMe and NVMe over Fabric (NVMe-oF) performance in virtual environments.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
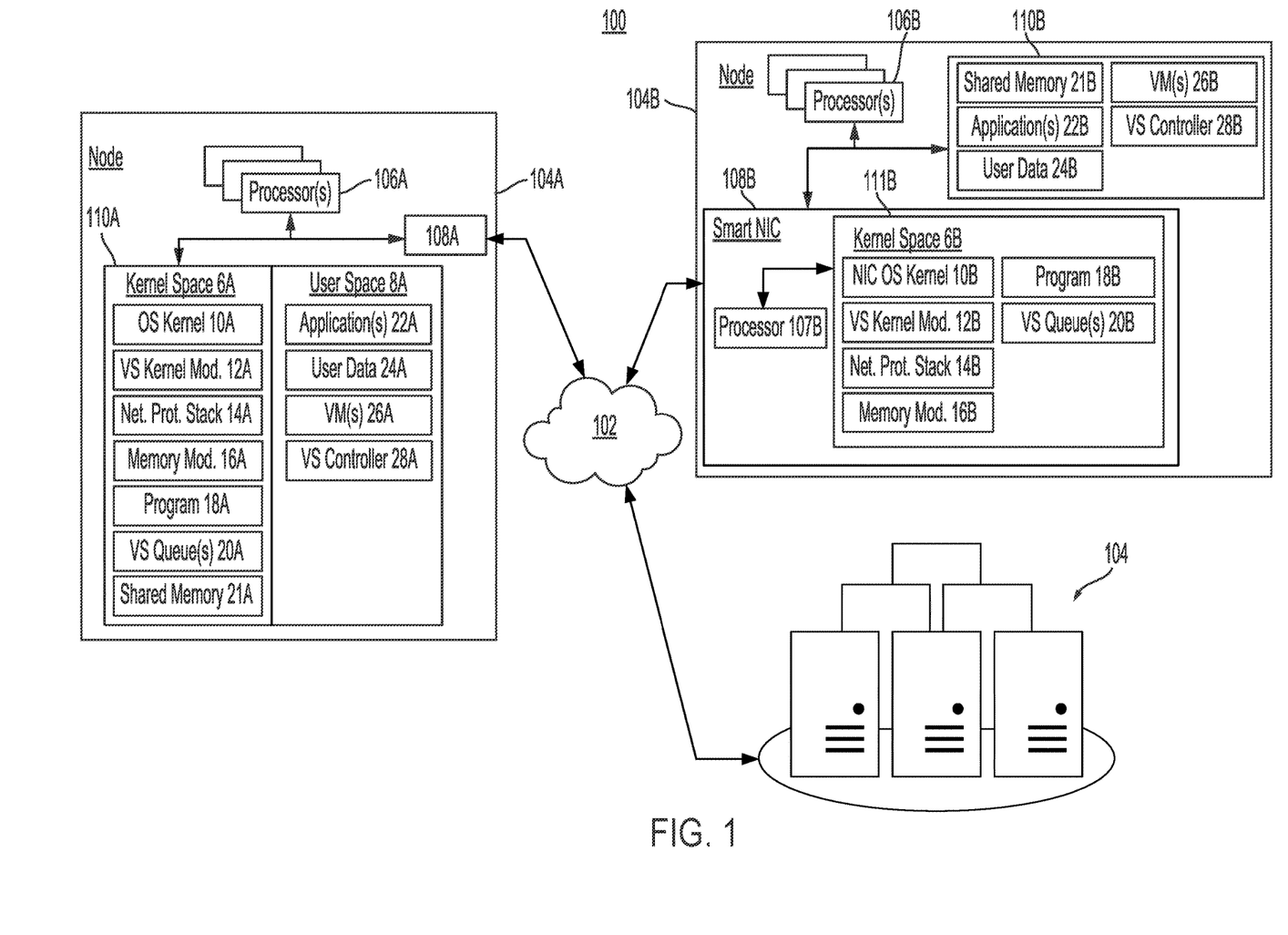
FIG. 1 is a block diagram of an example network environment for implementing virtualized Non-Volatile Memory express (NVMe) processing according to one or more embodiments.

FIG. 1 illustrates an example network environment 100 for implementing virtualized Non-Volatile Memory express (NVMe) processing according to one or more embodiments. As shown in FIG. 1, nodes 104 communicate with each other via network 102. Nodes 104 may function as, for example, servers or processing nodes and/or memory nodes. As a processing node or compute node, a node 104 can include one or more processors 106, such as Reduced Instruction Set Computer (RISC)-V cores or other type of Central Processing Unit (CPU) to process data, such as for a distributed application. As a memory node, a node 104 provides a shared memory that may be accessed by other nodes in network 102 and form part of a distributed memory system shared among nodes in network 102.

In some cases, some of nodes 104 may function as, for example, storage nodes that store data that can be accessed by nodes 104 and stored locally in a shared memory that forms part of the distributed memory system. In this regard, some of nodes 104 can include, for example, one or more rotating magnetic disks, and/or non-volatile solid-state memory, such as flash memory. In some implementations, a single node 104 may include one or more Solid-State Drives (SSDs) and/or Hard Disk Drives (HDDs). As discussed in more detail below, data retrieved from nodes or processed by nodes 104 can be cached or stored in respective shared memories 21 at nodes 104 that form the distributed memory to provide faster access to data as compared to retrieving data from storage devices of remote and/or local nodes 104.

In some implementations, network environment 100 in FIG. 1 may be used as at least part of a data center and/or for distributed processing, such as for distributed machine learning or big data analysis. As will be appreciated by those of ordinary skill in the art, nodes 104 are shown for the purposes of illustration, and network environment 100 can include many more nodes 104 than those shown in FIG. 1. In addition, those of ordinary skill the art will appreciate that network environment 100 can include more components than shown in FIG. 1, such as aggregated switches, Top of Rack (ToR) switches, and network controllers, for example.

Network 102 can include, for example, a Storage Area Network (SAN), a Local Area Network (LAN), and/or a Wide Area Network (WAN), such as the Internet. In this regard, nodes 104 may not be in the same geographic location. Nodes 104 may communicate using one or more standards such as, for example, Ethernet.

Each of nodes 104A and 104B in the example of FIG. 1 includes one or more processors 106, a network interface 108, and a memory 110. These components of nodes 104 may communicate with each other via a bus, which can include, for example, a Peripheral Component Interconnect express (PCIe) bus. In some implementations, nodes 104 may include NVMe over Fabric (NVMe-oF) nodes that are configured to communicate with other nodes 104 using NVMe messages (e.g., NVMe commands and responses) that may be, for example, encapsulated in Ethernet packets using Transmission Control Protocol (TCP). In this regard, network interfaces 108A and 108B of nodes 104A and 104B, respectively, may include Network Interface Cards (NICs), network interface controllers, or network adapters.

In the example of FIG. 1, node 104B includes smart NIC 108B as its network interface. As discussed in more detail below, smart NIC 108B includes its own processor 107B and memory 111B that can be used for packet handling with Virtual Switching (VS) queues, such as Open vSwitch (OVS) queues. This arrangement can improve the performance of node 104B by offloading such operations from a processor 106B of node 104B to smart NIC 108B. In some implementations, smart NIC 108B may also serve as an NVMe controller for controlling operation of memory 110B, which can be an NVMe device.

Processors 106 and 107B in FIG. 1 can execute instructions, such as instructions from one or more user space applications (e.g., applications 22) or programs (e.g., program 18) loaded from memory 110 or 111B, or from an Operating System (OS) kernel 10. Processors 106 and 107B can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107B can include a System on a Chip (SoC), which may be combined with a memory 110 or 111B, respectively.

Memories 110 and 111B can include, for example, a volatile Random Access Memory (RAM) such as Static RAM (SRAM), Dynamic RAM (DRAM), or a non-volatile RAM, or other solid-state memory that is used by processors 106 or 107B. Data stored in memory 110 or memory 111B can include data read from another node 104, data to be stored in another node 104, instructions loaded from an application or from an OS for execution by the processor, and/or data used in executing such applications, such as user data 24.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 110 or 111B may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Memory 110A of node 104A includes a kernel space 6A that is used by OS kernel 10A and a user space 8A that is used by one or more user space applications 22A, one or more Virtual Machines (VMs) 26A, and VS controller 28A. Kernel space 6A and user space 8A can include separate portions of virtual memory mapped to physical addresses in memory 110A. As will be understood by those of ordinary skill in the art, access to kernel space 6A is generally restricted to OS kernel 10A, its kernel extensions, and other portions of an OS, such as device drivers, while access to user space 8A is available to applications 22A, VMs 26A, and VS controller 28A, in addition to the OS. In this regard, the OS of node 104A or the OS of smart NIC 108B allocates hardware and software resources, such as memory, network, and processing resources of the device.

As shown in FIG. 1, kernel space 6A includes OS kernel 10A, VS kernel module 12A, network protocol stack 14A, memory module 16A, program 18A, one or more VS queues 20A, and shared memory 21A. In implementations where the OS of node 104A is Linux, memory module 16A and program 18A can include extended Berkely Packet Filter (eBPF) programs that are executed as an extension of the Linux kernel. Notably, eBPF can enable reprogramming of the kernel behavior without requiring changes to the kernel source code or loading a kernel module. In addition, eBPF includes a verifier to ensure safe execution of eBPF programs.

VS kernel module 12A can be used by the kernel to handle requests received from VMs 26A in user space 8A to communicate with other VMs either locally at node 104A or at a different node, such as node 104B. In some implementations, VS kernel module 12A can include an OVS kernel module. As a virtual switch, VS kernel module 12A can use flow tables (e.g., match-action tables) and perform table lookup operations in kernel space 6A for requests received from VMs to identify a corresponding socket or port to send a packet for the request. The VS module in the kernel can process packets in a kernel data path, and if the VS kernel module cannot find a match in its flow tables, the kernel path can pass the packet to the VS controller in the user space to process a new flow. The user space VS controller can then update the VS kernel module's data path tables so that subsequent packets for the flow can be processed in the kernel for faster processing. In some implementations, VS controller 28A can include an OVS controller or agent.

In node 104A, program 18A attaches to VS kernel module 12A and to the transport and application layers of network protocol stack 14A to create packets for NVMe requests, including any NVMe-oF headers and/or TCP headers for the packets. In some implementations, program 18A can also add a flow tag to a packet to identify respective user space applications 22A as the sources of the NVMe requests. Program 18A also controls the creation of VS queues 20A, the queuing of packets into different VS queues 20A based on a user space application that initiated a request, and the dequeuing of the packets from VS queues 20A. In this way, program 18A can provide a context-aware handling of packets that is based on the requirements or Quality of Service (QoS) of the user space applications issuing the NVMe requests and the resources available at node 104A.

For example, certain user space applications, either locally executed at node 104A or remotely executed at a different node 104, may issue many requests or requests with a large amount of data that can effectively block or significantly delay requests from other applications that issue requests less frequently. The use of separate VS queues for different applications can help ensure that an application with less frequent requests is not blocked by another application since the applications do not share the same VS queue and the respective VS queues can be dequeued at a particular rate that can be balanced or weighted amongst the VS queues to meet the varying QoS requirements of the different applications initiating requests. For example, higher priority requests, such as for more time-sensitive applications (e.g., video applications) can have a VS queue that is serviced or dequeued more frequently than other VS queues. In some implementations, the number of VS queues 20A can depend on the number of runtime or active user applications sending requests to the kernel. In addition, the packets queued in a particular VS queue may originate from the same user space application executing at different nodes 104, such as for a distributed processing application.

In one aspect, program 18A, which is executed in kernel space 6A, can receive an NVMe request via a transport layer of OS kernel 10A from a user space application 22A executed by a VM 26A in user space 8A to send an NVMe command (e.g., a write command or a read-modify-write command) to a different node 104 in network 102. As noted above, program 18A can create the packet or packets for the NVMe request, which can include creating NVMe-oF headers and TCP headers for the one or more packets. In addition, program 18A can determine whether a data size to be sent to the different node 104 for the NVMe request exceeds a maximum segment size of an NVMe-oF connection with the different node 104. If so, the NVMe command and its associated data, such as data to be written in a shared memory 21 of the different node 104, will be segmented into multiple packets. Program 18A can determine an order for sending the packets it creates for the NVMe command such that one or more packets including data for performing the NVMe command are sent before a last packet that includes the NVMe command. Program 18A may then send the packets in the determined order using network protocol stack 14A.

By sending the packets including data for the command before sending the last packet including the NVMe command, the different node 104 can start processing the packets for the data so that the NVMe command can be performed without having to wait for additional data packets to be received or processed by the different node 104. This arrangement can significantly reduce the latency of NVMe-oF operations by avoiding the delays associated with receiving the NVMe command before receiving the data needed to perform the NVMe command. Program 18A may also add an indicator, such as a flag bit, to the last packet for the NVMe request to identify the last packet for the different node 104.

In another aspect, program 18A can be used to support batching of packets in VS queues. As discussed in more detail below with reference to FIG. 5, the dequeuing of packets for requests from different user space applications that have been queued in respective VS queues can be delayed until reaching a threshold number of packets in the VS queue. This can ordinarily reduce the amount of context switches for the processors executing tasks for user space applications 22 at the node since the dequeued packets in the batch includes data and requests from the same initiating user space application that are likely directed to the same receiving user space application at the node.

In the example of FIG. 1, memory module 16A can enable OS kernel 10A to access data for the distributed memory system in shared memory 21A that is stored in kernel space 6A, as opposed to user space 8A. Frequently accessed data can be stored in shared memory 21A using memory module 16A to accelerate remote memory operations at a nearly line rate without requiring special hardware or changes to the kernel in the case where memory module 16A is an eBPF program. The remote memory operations, such as read requests and write requests, can be processed at an earlier point in the kernel, as opposed to having to traverse a full network stack and full I/O stack of the kernel to finally be handled by an application in user space 8A. For example, memory module 16A may operate at a lower block device driver layer in the I/O stack, without having to pass memory requests through higher layers in the I/O stack, such as a generic block layer and file system layer of the kernel. Similarly, memory module 16A may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed memory systems due to faster interface standards, such as NVMe-oF, and the increasing bandwidths of network hardware. Storing data for the distributed memory in kernel space 6A and/or performing operations in kernel space 6A can enable OS kernel 10A to respond quicker on behalf of user space applications 22A. Although there is some development in allowing user space applications to bypass the kernel and have direct access to storage or memory devices, such as NVMe devices, such performance improvements will come at the cost of reimplementing complicated default kernel functions in user space. In contrast, the in-kernel VS queuing operations of the present disclosure can use a kernel extension, such as an eBPF program, which is added to or injected into the kernel without requiring changes to the kernel source code or reloading a kernel module.

In the example of FIG. 1, shared memory 21A can be used by memory module 16A to share data between kernel space 6A and user space 8A. In some implementations, shared memory 21A can include one or more eBPF maps that enable copies of data to be provided to applications 22A in user space 8A and to store data from applications 22A. Shared memory 21A can include a data structure, such as a Key Value Store (KVS) or a table, for example. The use of an eBPF map as shared memory 21A can enable different applications 22A in a user space 8A to concurrently access the data stored in the shared memory.

Node 104B differs from node 104A in the example of FIG. 1 in that node 104A uses a kernel space 6B of the memory 111B of its smart NIC 108B for managing VS queues 20B and for performing the packet creation and packet ordering operations disclosed herein. As shown in FIG. 1, smart NIC 108B includes its own processor 107B and memory 111B that are used as a hardware offload from processors 106B for operations related to the distributed memory system and the data accessed in shared memory 21B. This arrangement can further improve the performance of node 104B by freeing up processing resources and memory for processors 106B.

Smart NIC 108B can include, for example, an SoC that includes both processor 107B and memory 111B. In the example of node 104B, smart NIC 108B includes its own NIC OS kernel 10B that allocates resources of smart NIC 108B and memory 110B. In some implementations, memory 110B is an NVMe memory device that stores shared memory 21B for the distributed memory system in a kernel space of memory 110B and executes one or more applications 22B, one or more VMs 26B, and VS controller 28B in a user space of memory 110B. Each of the one or more VMs 26B can run one or more user space applications 22B and use VS controller 28B to interface with VS kernel module 12B in kernel space 6B. In addition, user space applications 22B can access user data 24B for performing tasks in the user space.

Each of NIC OS kernel 10B, VS kernel module 12B, network protocol stack 14B, memory module 16B, program 18B, and one or more VS queues 20B is stored in a kernel space of memory 111B. In implementations where the NIC OS 10B is Linux, program 18B and memory module 16B can include eBPF programs that are executed as an extension of the Linux kernel.

VS kernel module 12B can be used by the kernel to handle requests received from VMs 26B to communicate with other VMs either locally at node 104B or at a different node, such as node 104A. As a virtual switch, VS kernel module 12B can use flow tables (e.g., match-action tables) and perform table lookup operations in kernel space 6B according to requests received from VMs to identify different sockets or ports for routing the requests.

In node 104B, program 18B attaches to VS kernel module 12B and to the transport and application layers of network protocol stack 14B to create packets for NVMe requests, including any NVMe-oF headers and/or TCP headers for the packets. In some implementations, program 18B can also add a flow tag to a packet to identify respective user space applications 22B as the sources of the NVMe requests. Program 18B also controls the creation of VS queues 20B, the queuing of packets into different VS queues 20B based on a user space application that initiated a request, and the dequeuing of the packets from VS queues 20B. In this way, program 18B can provide a context-aware handling of packets that is based on the requirements or QoS of the user space applications issuing the NVMe requests and the resources available at node 104B.

In one aspect, program 18B, which is executed in kernel space 6B, can receive an NVMe request via a transport layer of NIC OS kernel 10B from a user space application 22B executed by a VM 26B in a user space of node 104B to send an NVMe command (e.g., a write command or a read-modify-write command) to a different node 104 in network 102. As noted above, program 18B can create the packet or packets for the NVMe request, which can include creating NVMe-oF headers and TCP headers. In addition, program 18B can determine whether a data size to be sent to the different node 104 for the NVMe request exceeds a maximum segment size of an NVMe-oF connection with the different node 104. If so, the NVMe command and its associated data, such as data to be written in a shared memory 21 of the different node 104, will be segmented into multiple packets. Program 18B can determine an order for sending the packets it creates for the NVMe command such that one or more packets including data for performing the NVMe command are sent before a last packet that includes the NVMe command. Program 18B may then send the packets in the determined order using network protocol stack 14B.

By sending the packets including data for the command before sending the last packet including the command, the different node 104 can start processing the packets for the data, such as by parsing the packets and queuing the data and requests into VS queues at the different node, so that the NVMe command can be performed without having to wait for additional data packets to be received or processed by the different node 104. As noted above, this arrangement can significantly reduce the latency of NVMe-oF operations by avoiding the delays associated with receiving the NVMe command before receiving the data needed to perform the NVMe command. Program 18B may also add an indicator, such as a flag bit, to the last packet for the NVMe request to identify the last packet for the different node 104.

In another aspect, program 18B can be used to support batching of packets in VS queues 20B. As discussed in more detail below with reference to FIG. 5, the dequeuing of packets for the different user space applications from their respective VS queues can be delayed until reaching a threshold number of packets for the VS queue. This can ordinarily reduce the amount of context switches for the processors executing tasks for user space applications 22B since the dequeued packets in the batch are all from the same initiating user space application and are most likely directed to the same receiving user space application 22B.

Shared memory 21B can be used by memory module 16B to share data between a kernel space and a user space. In some implementations, shared memory 21B can include one or more eBPF maps that enable copies of data to be provided to applications 22B in user space and to store data from applications 22B. Shared memory 21B can include a data structure, such as a KVS or a table, for example. The use of an eBPF map as shared memory 21B can enable different applications 22B in a user space to concurrently access the data stored in the shared memory.

Those of ordinary skill in the art will appreciate with reference to the present disclosure that other implementations may include a different number or arrangement of nodes 104 than shown in the example of FIG. 1. In this regard, network environment 100 shown in FIG. 1 is for the purposes of illustration, and those of ordinary skill in the art will appreciate that network environment 100 may include many more nodes 104, and additional components, such as routers and switches, than shown in the example of FIG. 1.

In addition, those of ordinary skill in the art will appreciate with reference to the present disclosure that the modules, programs, and data structures shown in FIG. 1 may differ in other implementations. For example, node 104A or smart NIC 108B can include a different number of programs 18 than shown in FIG. 1, such as in implementations where different programs may be used for managing VS queues 20, creating packets, and/or determining an order for sending packets to a different node 104. As another example variation, each node 104 can include additional programs executed in a kernel space for performing other operations, such as computational operations for the distributed memory system like data compression, data encryption, scatter-gather operations, and/or data deduplication.

Example Processes

Figure 2:
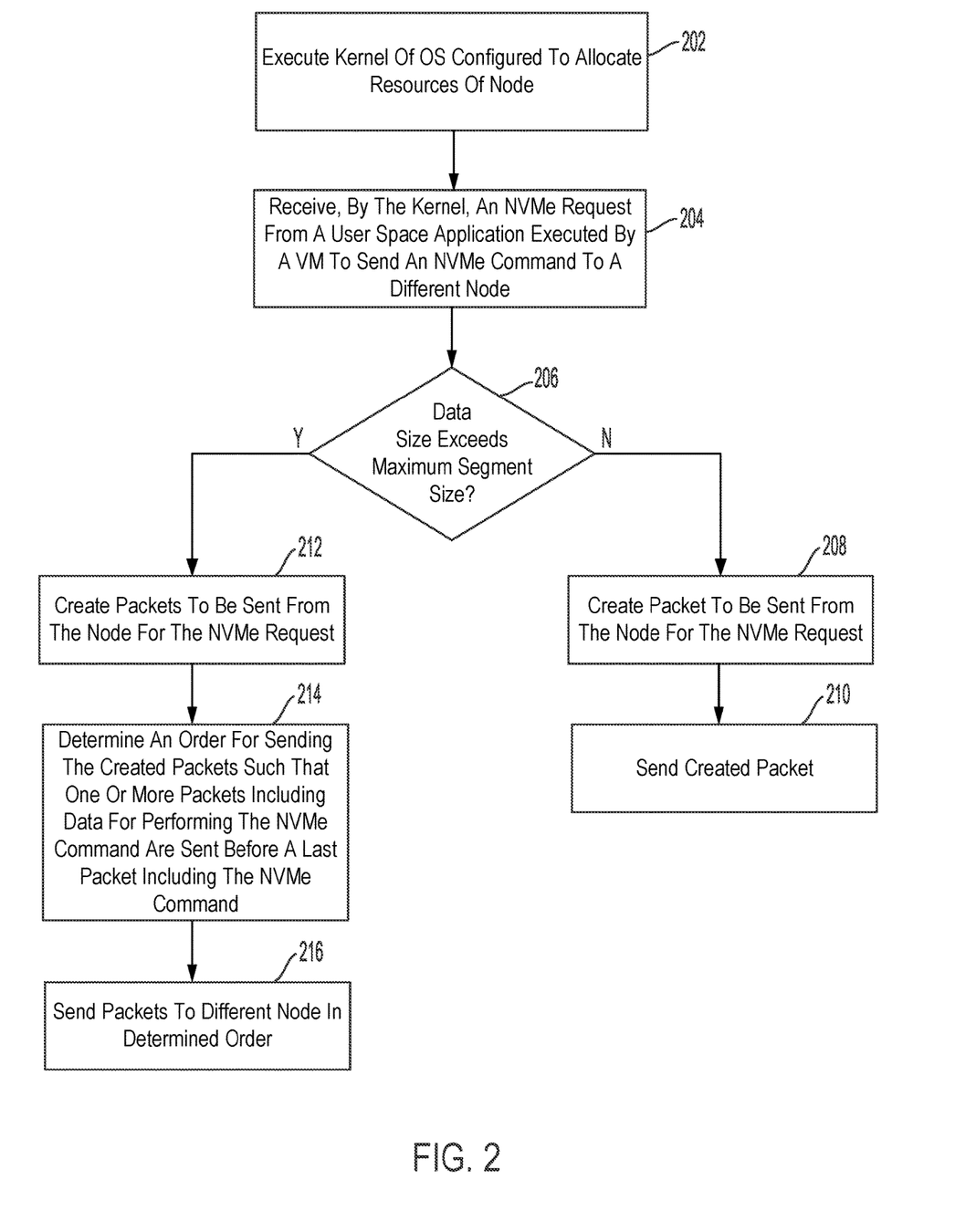
FIG. 2 is a flowchart for a packet creation process according to one or more embodiments.

FIG. 2 is a flowchart for a packet creation process according to one or more embodiments. The process of FIG. 2 can be performed by, for example, at least one processor 106A of node 104A in FIG. 1 executing program 18A or at least one processor 107B of smart NIC 108B executing program 18B.

In block 202, a kernel of an OS is executed by the at least one processor to allocate resources of a node. In implementations where the at least one processor executes a kernel for a smart NIC (e.g., NIC OS kernel 10B in FIG. 1), the at least one processor may use the OS to allocate resources of the smart NIC and the memory or storage that it controls.

In block 204, the kernel receives via a transport layer of its network protocol stack an NVMe request from a user space application to send an NVMe command to a different node via a network. The user space application is executed by a VM in a user space of the node. The at least one processor may parse the NVMe request to identify the request as an NVMe command, such as by identifying an opcode, in the request that indicates a command, such as a read command, write command, or read-modify-write command. The at least one processor may also identify the NVMe request as being for a VM executing on a different node, as opposed to on the local node, by accessing the flow tables of a VS kernel module.

In block 206, the at least one processor determines whether a data size to be sent to the different node for the NVMe request exceeds a maximum segment size of an NVMe-oF connection with the different node. The maximum segment size may be set during a connection setup between the nodes and stored, for example, in a directory accessible by a network protocol stack of the kernel.

If it is determined in block 206 that the data size does not exceed the maximum segment size, the at least one processor creates a packet for the NVMe request that includes the NVMe command. The packet creation can include creating an NVMe-oF header and a TCP header for the packet and adding a flow tag to the packet to indicate the user space application that initiated the NVMe request for the command to be sent to the different node. For the flow tag, the at least one processor may identify the application initiating the request using, for example, a port number or socket ID that sent the NVMe request to the kernel. The at least one processor may then use, for example, a priority field or other field of the packet to indicate the application sending the NVMe request, such as, for example, an 802.1Q tag in an Ethernet header as part of the IEEE 802.1Qbb Priority-based Flow Control (PFC) standard.

In block 210, the at least one processor queues the created packet into a VS queue to be sent to the different node via the network protocol stack of the kernel. In some implementations, the at least one processor may queue the packet into a VS queue for the user space application that initiated the NVMe request. In such implementations, the at least one processor may also create a new VS queue for queueing packets that originate from the user space application. The packet is then dequeued from the VS queue to send the packet to the different node.

On the other hand, if it is determined in block 206 that the data size for the NVMe request exceeds the maximum segment size, the at least one processor creates multiple packets in block 212 to be sent from the node to the different node for the NVMe request. The packet creation can include creating NVMe-oF headers and TCP headers for the packets and adding flow tags to the packets to indicate the user space application that initiated the NVMe request for the command to be sent to the different node. The packet creation can also include adding a packet sequence number to each packet for the NVMe request to aid the different node in assembling the data to be performed for the command and the addition of an indicator for the last packet to indicate the last packet containing the NVMe command.

In block 214, the at least one processor determines an order for sending the created packets such that one or more packets including data for performing the NVMe command are sent before a last packet of the created packets that includes the NVMe command. As noted above, sending the packets including data for the command before sending the last packet including the NVMe command, the different node can start processing the packets for the data so that the NVMe command can be performed without having to wait for additional data packets to be received or processed by the different node 104. This arrangement can significantly reduce the latency of NVMe-oF operations by avoiding the delays associated with receiving the NVMe command before receiving the data needed to perform the NVMe command.

In block 216, the at least one processor queues the created packets into a VS queue in the determined order to be sent to the different node via the network protocol stack of the kernel. As discussed above, the at least one processor may queue the packets into a VS queue for the user space application that initiated the NVMe request. In such implementations, the at least one processor may also create a new VS queue for queueing packets that originate from the user space application. The packets are then dequeued to be sent to the different node in the determined order.

Those of ordinary skill in the art will appreciate with reference to the present disclosure that the blocks for the packet creation process of FIG. 2 may differ in other implementations. For example, blocks 202 and 204 can be performed concurrently or the sending of packets in blocks 216 or 210 can be accomplished by populating a different type of queue than a VS queue.

Figure 3:
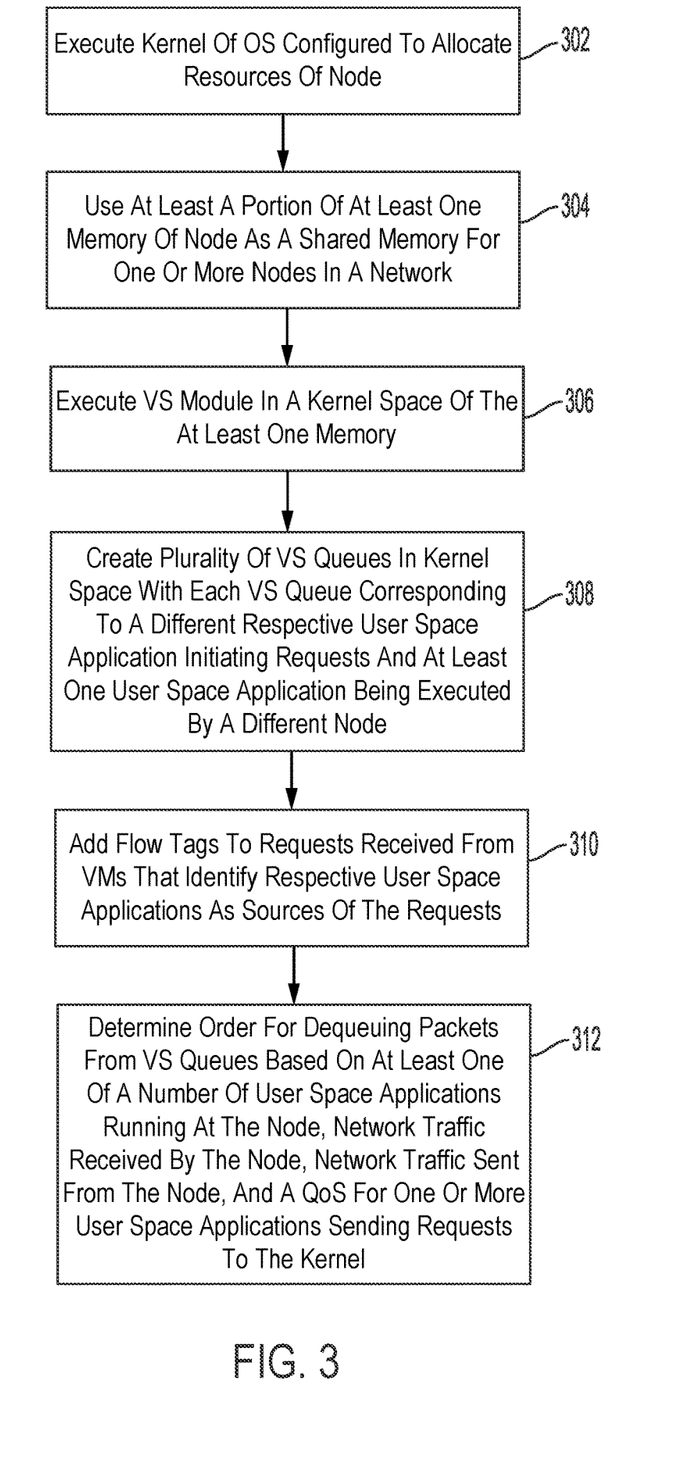
FIG. 3 is a flowchart for a Virtual Switching (VS) queue management process according to one or more embodiments.

FIG. 3 is a flowchart for a VS queue management process according to one or more embodiments. The process of FIG. 3 can be performed by, for example, at least one processor 106A of node 104A in FIG. 1 executing program 18A or at least one processor 107B of smart NIC 108B executing program 18B.

In block 302, a kernel of an OS is executed by the at least one processor to allocate resources of a node. In implementations where the at least one processor executes a kernel for a smart NIC (e.g., NIC OS kernel 10B in FIG. 1), the at least one processor may use the OS to allocate resources of the smart NIC and the memory or storage that it controls.

In block 304, at least a portion of at least one memory of the node is used as a shared memory in a distributed memory system (e.g., shared memory 21A or 21B in FIG. 1). In this regard, the distributed memory system can include respective shared memories of other nodes on a network.

In block 306, the at least one processor executes a VS kernel module in a kernel space of the at least one memory. As discussed above, the VS kernel module can be used by the node to perform a virtual switching between VMs operating at the local node and/or remote nodes in the network by providing flow tables that identify sockets for the different VMs. In addition, a kernel extension program, such as an eBPF program, can be used to create and manage the VS queues used by the VS kernel module.

In block 308, the at least one processor creates a plurality of VS queues in a kernel space of the at least one memory with each VS queue corresponding to a different respective user space application initiating requests. As part of a distributed memory system, at least one of the VS queues created in block 308 can be for a user space application being executed at a different node on the network. As discussed above, and with reference to the packet reception process of FIG. 4, the at least one processor can use the program attached to the VS kernel module and to the transport and application layers of the network protocol stack to identify a flow tag or other application identifier to determine when a new VS queue should be created for a new flow.

In block 310, the at least one processor uses the program to add flow tags or another type of application identifier that indicates the user space application initiating requests received from VMs as the sources of the requests. In some implementations, the program may use a field in a packet, such as an 802.1Q tag in an Ethernet header, as a flow tag identifying the user space application. In this regard, the use of the flow tags can indicate a priority or a QoS for the requests received from the user space application that the program can use to determine how often or when to dequeue packets from a particular VS queue for the user space application.

In block 312, the at least one processor using the program dequeues packets from the VS queues based on at least one of a number of user space applications running at the node, network traffic received by the node, network traffic sent by the node, and a QoS for one or more of the user space applications sending requests to the kernel. In some cases, the dequeued packets are routed to the appropriate VM in the user space of the node. In other cases, a program executed in the kernel may handle responding to a request from a remote node without involving the user space application or VM at the local node. Examples of such remote memory operations are provided in related application Ser. No. 17/561,898, which is incorporated by reference above.

In some implementations, the program may dequeue packets more frequently when there are less user space applications running at the local node or lower levels of network traffic being received by the node (e.g., less than a threshold level of applications running or a threshold frequency of packets being received) since more resources may be available at the node for processing the requests and data included in the packets. The program may perform other types of context-aware scheduling by determining which VS queue to dequeue packets from based on whether the packets from the corresponding application are being sent to a local VM or to a VM running on a different node. For example, the program may dequeue packets from a VS queue for an application that is sending packets to a remote node when the network traffic being sent from the local node is below a threshold level and dequeue packets from a VS queue for an application that is executed at a remote node when the network traffic being received at the local node is above a threshold level.

In addition, the dequeuing of packets can be based on QoS requirements or a priority for a particular application. In this regard, some VS queues may be dequeued or serviced more frequently for applications that may have a higher QoS requirement (e.g., lower latency requirement) than VS queues for other applications. As discussed above, the foregoing use of different VS queues for different applications can also help ensure a more equal access to the resources of the node by the different applications, such as by ensuring that the requests from an application issuing larger and/or more frequent requests do not block the dequeuing of requests from an application that issues its requests less frequently.

Those of ordinary skill in the art will appreciate with reference to the present disclosure that other implementations of the VS queue management process of FIG. 3 may differ. For example, blocks 302 to 312 can be performed concurrently or the order of the performance of the blocks can differ such as for the creation of new VS queues in block 308 in response to new requests being received from a different user space application.

Figure 4:
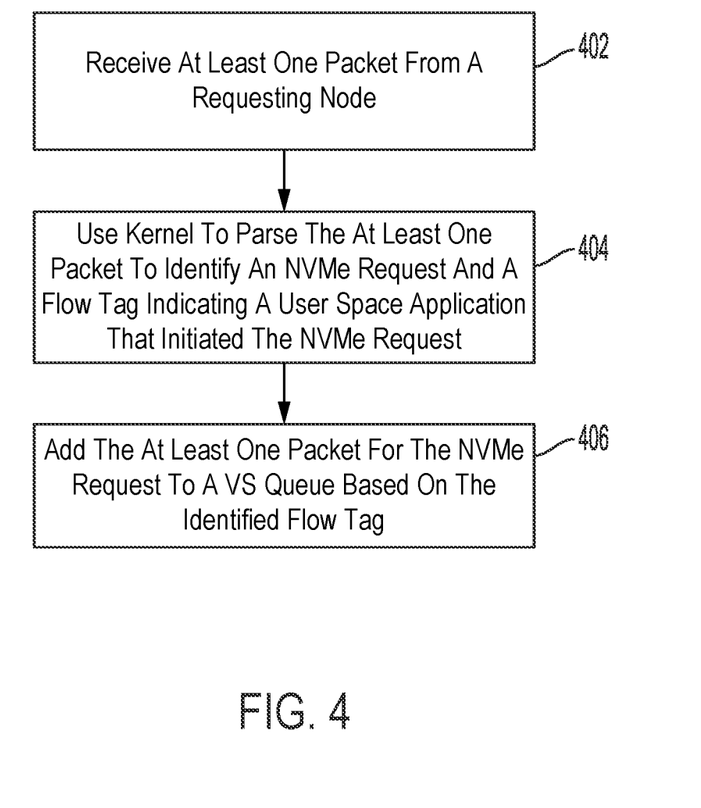
FIG. 4 is a flowchart for a packet reception process according to one or more embodiments.

FIG. 4 is a flowchart for a packet reception process according to one or more embodiments. The process of FIG. 4 can be performed by, for example, at least one processor 106A of node 104A in FIG. 1 executing program 18A or at least one processor 107B of smart NIC 108B executing program 18B.

In block 402, at least one packet is received by the node from a requesting node in the network. The at least one packet may include a single packet received from the different node or may include a series of packets from the different node. A program attached to the transport layer of the network protocol stack is executed by at least one processor of the node and can intercept the packet at an early stage in the processing of the at least one packet by the kernel.

In block 404, the program executing in the kernel space parses the at least one packet to identify an NVMe request and a flow tag indicating a user space application that initiated the NVMe request from the requesting node. In some implementations, the program may stop processing of the at least one packet after parsing the packet or packets and determining that the packet is a different type of message that does not include an NVMe request. In parsing the packet, the at least one processor can identify an NVMe-oF header in the packet and a flow tag for the packet or packets that identifies the packet or packets as originating from a particular user space application executed by the requesting node. In some cases, the user space application may be executed at multiple requesting nodes, such as for a distributed application. As discussed above, the flow tag can include, for example, a priority field or other field in the packet that can identify the user space application.

In block 406, the at least one processor executing the program adds the at least one packet for the NVMe request to a VS queue of the VS kernel module based on the flow tag. The NVMe request in some cases can include one or more packets including data for performing an NVMe command followed by a last packet including the NVMe command that may be flagged or otherwise indicated as the last packet for the NVMe command, as discussed above with respect to the process of FIG. 2.

As discussed above, the sorting of packets initiated from different user space applications into different VS queues can improve the processing and handling of the packets. In one aspect, the packets can be dequeued in bursts, such as in groups of sixteen packets using the VS kernel module, that can reduce the occurrence of context switches between different user space applications since the packets in a given VS queue are likely to be sent to the same user space application due to the packets being from the same requesting user space application. In addition, the sorting of packets into different VS queues based on the originating user space application can prevent applications that frequently send packets from blocking applications that do not issue as many packets and can enable different dequeuing or scheduling policies based on the different needs of the respective user space applications, such as different QoS requirements for the different applications.

Those of ordinary skill in the art will appreciate with reference to the present disclosure that the process of FIG. 4 may be performed in a different order. For example, the performance of blocks 402, 404, and/or 406 may overlap as new packets are being received from the requesting node or nodes in block 402 as previously received packets are being parsed in block 404 and added to a VS queue in block 406.

Figure 5:
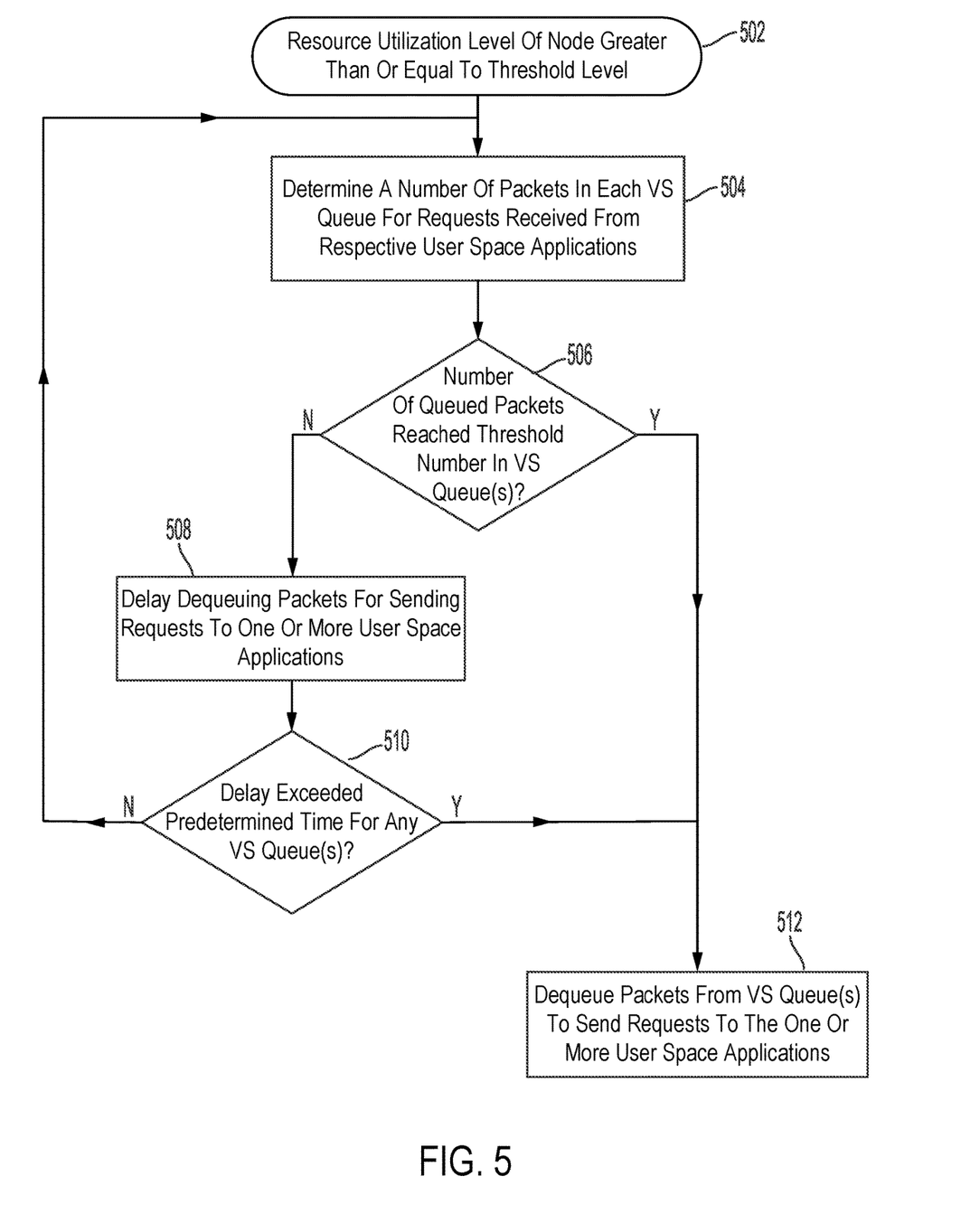
FIG. 5 is a flowchart for a packet batching process according to one or more embodiments.

FIG. 5 is a flowchart for a packet batching process according to one or more embodiments. The process of FIG. 5 can be performed by, for example, at least one processor 106A of node 104A in FIG. 1 executing program 18A or at least one processor 107B of smart NIC 108B executing program 18B. The queued packets can correspond to NVMe requests or other types of messages in different VS queues that originated from respective user space applications and are queued for VMs executing at the local node or for VMs executing at another node in the distributed memory system.

In some implementations, the packets in the same VS queue may have originated from the same user space application executing at multiple nodes, such as in a distributed processing implementation.

In certain conditions, the program executed in the kernel space may delay dequeuing packets from one or more VS queues until a threshold number of packets have been accumulated in one of the VS queues. This queue-level batching of packets can reduce the number of interrupts and context switching in the user space caused by notifying different user space applications less frequently for the batched or grouped requests or messages as compared to sending interleaved requests or messages that are being sent from different user space applications. In this regard, VS queues are typically dequeued in bursts of sixteen packets at a time. However, the dequeuing of batches of sixteen packets at a time from the same VS queue when the packets in the VS queue all originate from the same user space application can improve processing and memory resource utilization at the node.

In block 502, the packet batching process is triggered or initialized in response to a resource utilization level of the node being greater than or equal to a threshold level. In this regard, the batching of packets may only be used when delaying the dequeuing of packets will not introduce much additional delay. For example, if processing resources of the node are less than a threshold level (e.g., the processor or processors used by the user space applications are not fully scheduled) and/or the frequency of requests or messages to be sent to the user space is less than a threshold frequency, the batching of the dequeuing of the packets may not be advantageous since the batching would introduce delay when resources are otherwise available for handling the messages or requests in the user space.

In block 504, the program executed by the kernel determines the number of packets queued in each VS queue. As noted above, the at least one processor executing the program can determine the number of packets queued in each VS queue corresponding to different originating user space applications.

In block 506, it is determined whether the number of queued packets in each VS queue is less than a threshold number of packets. The threshold number of packets may be based on a number of packets that are dequeued by the VS kernel module at a time, such as sixteen packets. In such an example, the program in block 506 can determine if any of the VS queues for the different originating applications has less than sixteen packets queued.

If the number of queued packets in any of the VS queues is greater than or equal to the threshold number of packets in block 506, the packets for that queue or queues are dequeued by the threshold number of packets in block 512. The dequeued packets can then be processed by the kernel and passed to one or more user space applications if needed. As noted above, the packets dequeued from a given VS queue are likely destined for the same user space application given the proximity in time of reception from the same originating application.

If the number of queued packets in each of the VS queues is less than the threshold number of packets in block 506, the program in the kernel space delays dequeuing the packets from those queues in block 508. In block 510, it is determined whether the delay has exceeded a predetermined time or QoS for any of the VS queues, which can be based on, for example, a maximum latency or time out value for processing requests from the user space application initiating the requests for the packets in the VS queue. In some implementations, the predetermined time may be set as a lower value than a timeout value or QoS requirement to ensure the delay caused by the batching does not exceed such application requirements. Accordingly, the different VS queues can have different predetermined times in block 510 due to different QoS requirements of the different originating user space applications.

If the delay has not exceeded the predetermined delay in block 510, the packet batching process returns to block 504 to determine new counts for the packets that have accumulated in the different VS queues. On the other hand, if the delay has exceeded a predetermined delay in block 510, the packet batching process proceeds to block 512 to dequeue packets from any queues that have a delay exceeding a predetermined time. As noted above, such batching in the dequeuing of packets from VS queues can improve the efficiency of the utilization of processing and memory resources by the user space applications since less interrupts are required as compared to not batching the packets from the VS queues.

Those of ordinary skill in the art will appreciate with reference to the present disclosure that other implementations of the example packet batching process of FIG. may differ. For example, in some implementations the batching process may be interrupted at any time to dequeue the accumulated packets based on the resource utilization of the node, such as the processing resources falling below the threshold level in block 502 or an available memory for the kernel space for the VS queues falling below a threshold size.

The foregoing packet handling and the use of in-kernel, virtual switch queuing of packets for NVMe requests based on different originating user space applications can improve remote and local NVMe access performance in virtual environments. As noted above, such packet queueing and dequeuing can provide context aware packet handling for individual applications that use the same distributed memory system but may have different performance requirements. In addition, the sending of NVMe-oF packets in a determined order so that the data for performing an NVMe command at a remote node is sent before a last packet including the NVMe command can also improve the processing efficiency of the remote node.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A node, comprising:
  at least one memory configured to be used at least in part as a shared memory in a distributed memory on a network;
  a network interface configured to communicate with one or more other nodes in the network; and
  at least one processor configured, individually or in combination, to:
    execute a kernel of an Operating System (OS) configured to allocate resources of the node;
    receive, by the kernel, a Non-Volatile Memory express (NVMe) request from a user space application executed by a Virtual Machine (VM) to send an NVMe command to a different node of the one or more other nodes;
    determine whether a data size to be sent to the different node for the NVMe request exceeds a maximum segment size of an NVMe over Fabric (NVMe-oF) connection with the different node; and
    in response to determining that the data size exceeds the maximum segment size:
      create packets to be sent from the node for the NVMe request;
      determine an order for sending the created packets such that one or more packets including data for performing the NVMe command are sent before a last packet of the created packets that includes the NVMe command; and
      send the created packets to the different node in the determined order.

2. The node of claim 1, wherein the at least one processor is further configured, individually or in combination, to add an indicator to the last packet for the NVMe request to identify the last packet for the different node.

3. The node of claim 1, wherein the at least one processor is further configured, individually or in combination, to add a flow tag to packets for requests received by the kernel that identify respective user space applications as the sources of the requests.

4. The node of claim 1, wherein the at least one processor is further configured, individually or in combination, to create a plurality of Virtual Switching (VS) queues in a kernel space of the at least one memory, wherein each VS queue of the plurality of VS queues corresponds to a different respective user space application initiating requests.

5. The node of claim 4, wherein the at least one processor is further configured, individually or in combination, to dequeue packets from the plurality of VS queues based on at least one of a number of user space applications running at the node, network traffic received by the node, network traffic sent from the node, and a Quality of Service (QOS) for one or more user space applications sending requests to the kernel.

6. The node of claim 1, wherein the at least one processor is further configured, individually or in combination, to attach an extended Berkeley Packet Filter (eBPF) program to a VS module in a kernel space of the at least one memory, and wherein the eBPF program is configured to create VS queues, add packets for requests to the VS queues, and dequeue packets for requests from the VS queues to send to user space applications.

7. The node of claim 1, wherein the at least one processor is further configured, individually or in combination, to:
  receive at least one packet from a requesting node of the one or more other nodes;
  use the kernel to parse the at least one received packet to identify an NVMe request or data for an NVMe request and a flow tag indicating a user space application executed on the requesting node that initiated the NVMe request; and
  add the at least one packet for the NVMe request to a VS queue based on the identified flow tag.

8. The node of claim 1, wherein the at least one processor is further configured, individually or in combination, to:
  use the kernel to determine that a resource utilization level of the node is greater than or equal to a threshold level; and
  in response to determining that the resource utilization level of the node is greater than or equal to the threshold level:
    determine respective numbers of packets in one or more VS queues for requests received from corresponding user space applications;
    determine whether the number of queued packets in each of the one or more VS queues is less than a threshold number of packets; and
    in response to determining that the number of queued packets in a VS queue is less than the threshold number of packets, delay dequeuing the queued packets in the VS queue for sending the requests to one or more user space applications until the number of queued packets in the VS queue is greater than or equal to the threshold number of packets.

9. The node of claim 8, wherein the at least one processor is further configured, individually or in combination, to:
determine that the delay in dequeuing the packets from a VS queue has exceeded a predetermined time for the VS queue; and
in response to determining that the delay in dequeuing the packets from the VS queue has exceeded the predetermined time, dequeue the packets from the VS queue.

10. A method, comprising:
executing a kernel of an Operating System (OS) configured to allocate resources of a node;
using at least a portion of at least one memory of the node as a shared memory for one or more other nodes in a network;
executing a Virtual Switching (VS) module in a kernel space of the at least one memory, the VS module configured to queue packets for a plurality of Virtual Machines (VMs) executed in a user space of the at least one memory;
creating a plurality of VS queues in the kernel space of the at least one memory, wherein each VS queue of the plurality of VS queues corresponds to a different respective user space application initiating requests, with at least one user space application being executed by the one or more other nodes;
receiving at least one packet from a different node of the one or more other nodes;
using the kernel to parse the at least one received packet to identify a flow tag indicating a user space application executed on the different node that initiated a request; and
adding the at least one packet for the request to a VS queue of the plurality of VS queues based on the identified flow tag.

11. The method of claim 10, further comprising:
receiving, by the kernel, a Non-Volatile Memory express (NVMe) request from a user space application executed by a VM of the plurality of VMs to send an NVMe command to a different node of the one or more other nodes;
determining whether a data size to be sent to the different node for the NVMe request exceeds a maximum segment size of an NVMe over Fabric (NVMe-oF) connection with the different node; and
in response to determining that the data size exceeds the maximum segment size:
creating packets to be sent from the node for the NVMe request;
determining an order for sending the created packets such that one or more packets including data for performing the NVMe command are sent before a last packet of the created packets that includes the NVMe command; and
sending the created packets to the different node in the determined order.

12. The method of claim 11, further comprising adding an indicator to the last packet for the NVMe request to identify the last packet for the different node.

13. The method of claim 10, further comprising adding flow tags to packets for requests received from VMs that identify respective user space applications as the sources of the requests.

14. The method of claim 10, further comprising dequeuing packets from the plurality of VS queues based on at least one of a number of user space applications running at the node, network traffic received by the node, network traffic sent from the node, and a Quality of Service (QOS) for one or more user space applications sending requests to the kernel.

15. The method of claim 10, further comprising attaching an extended Berkeley Packet Filter (eBPF) program to the VS module, wherein the eBPF program is configured to create VS queues, add packets to the VS queues, and dequeue packets for requests from the VS queues to send to user space applications running on the plurality of VMs.

16. The method of claim 10, further comprising:
using the kernel to determine that a resource utilization level of the node is greater than or equal to a threshold level; and
in response to determining that the resource utilization level of the node is greater than or equal to the threshold level:
determining respective numbers of packets in one or more VS queues for requests received from corresponding user space applications;
determining whether the number of queued packets in each of the one or more VS queues is less than a threshold number of packets; and
in response to determining that the number of queued packets in a VS queue is less than the threshold number of packets, delaying dequeuing the queued packets in the VS queue for sending the requests to one or more user space applications until the number of queued packets in the VS queue is greater than or equal to the threshold number of packets.

17. The method of claim 16, further comprising:
determining that the delay in dequeuing the packets from a VS queue has exceeded a predetermined time for the VS queue; and
in response to determining that the delay in dequeuing the packets from the VS queue has exceeded the predetermined time, dequeuing the packets from the VS queue.

18. The method of claim 10, wherein the request is a Non-Volatile Memory express (NVMe) request.

19. A node, comprising:
at least one memory configured to be used at least in part as a shared memory in a distributed memory system on a network;
a network interface configured to communicate with one or more other nodes in the network; and
means for:
executing a kernel of an Operating System (OS) configured to allocate resources of the node;
receiving, by the kernel, a Non-Volatile Memory express (NVMe) request from a user space application executed by a Virtual Machine (VM) to send an NVMe command to a different node of the one or more other nodes;
determining whether a data size to be sent to the different node for the NVMe request exceeds a maximum segment size of an NVMe over Fabric (NVMe-oF) connection with the different node; and
in response to determining that the data size exceeds the maximum segment size:
creating packets to be sent from the node for the NVMe request; and
determining an order for sending the created packets such that one or more packets including data for performing the NVMe command are sent before a last packet of the created packets that includes the NVMe command.

20. The node of claim 19, wherein the means is further for creating a plurality of Virtual Switching (VS) queues in a kernel space of the at least one memory, wherein each VS queue of the plurality of VS queues corresponds to a different respective user space application initiating requests with at least one user space application being executed by the one or more other nodes.

* * * * *